US010063929B1

(12) United States Patent
Barker

(10) Patent No.: US 10,063,929 B1
(45) Date of Patent: Aug. 28, 2018

(54) COMMUNITY CONTROLLED AUDIO ENTERTAINMENT SYSTEM

(71) Applicant: Bruce James Barker, Franklin, MA (US)

(72) Inventor: Bruce James Barker, Franklin, MA (US)

(73) Assignee: NUFBEE LLC, Westborough, MA (US)

( * ) Notice: Subject to any disclaimer, the term of this patent is extended or adjusted under 35 U.S.C. 154(b) by 17 days.

(21) Appl. No.: 15/594,330

(22) Filed: May 12, 2017

Related U.S. Application Data

(63) Continuation-in-part of application No. 15/411,313, filed on Jan. 20, 2017.

(60) Provisional application No. 62/382,763, filed on Sep. 1, 2016.

(51) Int. Cl.
| | |
|---|---|
| *H04N 7/16* | (2011.01) |
| *H04N 21/4788* | (2011.01) |
| *H04N 21/439* | (2011.01) |
| *H04N 21/431* | (2011.01) |
| *H04N 21/2187* | (2011.01) |
| *G06F 3/0482* | (2013.01) |
| *G06F 3/16* | (2006.01) |
| *G06F 3/0481* | (2013.01) |
| *G10L 13/08* | (2013.01) |

(52) U.S. Cl.
CPC ....... *H04N 21/4788* (2013.01); *G06F 3/0482* (2013.01); *G06F 3/04817* (2013.01); *G06F 3/165* (2013.01); *G10L 13/08* (2013.01); *H04N 21/2187* (2013.01); *H04N 21/439* (2013.01); *H04N 21/4312* (2013.01)

(58) Field of Classification Search
None
See application file for complete search history.

(56) References Cited

U.S. PATENT DOCUMENTS

| | | | | |
|---|---|---|---|---|
| 5,793,980 | A | * | 8/1998 | Glaser .................... H04H 20/28 370/352 |
| 7,277,445 | B2 | | 10/2007 | Bartfeld et al. |
| 7,346,919 | B2 | | 3/2008 | Bartfeld |
| 7,571,458 | B1 | | 8/2009 | Eyal |

(Continued)

OTHER PUBLICATIONS

Lassonde Staff, "BLERP: App for Sharing Your Favorite Soundbites," http//lassonde.utah.edu/blerp, Jun. 9, 2017.

(Continued)

*Primary Examiner* — William J Kim

(57) ABSTRACT

A group-controlled audio entertainment system provides each member of a group with the ability to rapidly select an audio clip from a menu of canned audio clips, and to cause an audio speaker to timely play the selected audio clip in a room where the group is watching a sporting event. The menu of audio clips is chosen to include a variety of sound recordings that fans will consider amusing or pertinent to certain types of sporting events, such as pre-recorded "trash-talk" clips. The system also allows users from remote locations to send audio clips to the audio speaker, to thereby "trash talk" during game time. Remote users can record audio clips and then forward them to the group-controlled audio speaker, or can send text and/or email messages to the group-controlled speaker that the system converts to corresponding audio.

21 Claims, 5 Drawing Sheets

(56) References Cited

U.S. PATENT DOCUMENTS

| | | | |
|---|---|---|---|
| 7,647,617 | B2 | 1/2010 | Bartfeld et al. |
| 8,095,120 | B1 | 1/2012 | Blair et al. |
| D666,629 | S | 9/2012 | Lee et al. |
| 8,448,206 | B2 | 5/2013 | Roberts et al. |
| 8,458,256 | B2 | 6/2013 | Polls et al. |
| 8,482,671 | B1 | 7/2013 | Chen |
| 8,561,118 | B2 | 10/2013 | Flynn-Ripley et al. |
| 8,566,876 | B2 | 10/2013 | Morris et al. |
| 8,584,031 | B2 | 11/2013 | Moore et al. |
| 8,613,026 | B2 * | 12/2013 | Malhotra ............ H04L 65/1086 455/416 |
| 8,630,283 | B1 * | 1/2014 | Breau ................. H04L 12/6418 370/329 |
| 8,683,501 | B2 | 3/2014 | Huegel |
| 8,694,031 | B2 | 4/2014 | Lew et al. |
| 8,819,726 | B2 | 8/2014 | Wetzer et al. |
| 8,840,474 | B1 | 9/2014 | Dasan et al. |
| 8,850,466 | B2 | 9/2014 | Beskrovny |
| 8,863,185 | B2 | 10/2014 | Stinson, III et al. |
| 8,863,198 | B2 | 10/2014 | Sirpal et al. |
| 8,896,765 | B1 | 11/2014 | White et al. |
| 8,918,085 | B2 | 12/2014 | Lew et al. |
| 8,930,992 | B2 | 1/2015 | Sugiyama et al. |
| 8,935,349 | B2 | 1/2015 | Kennedy |
| 8,966,525 | B2 * | 2/2015 | Mehta ................. G06Q 30/0251 725/34 |
| 8,996,639 | B1 * | 3/2015 | Faaborg ................. H04L 51/02 455/412.1 |
| 9,043,841 | B2 | 5/2015 | Kuo et al. |
| 9,063,652 | B2 | 6/2015 | Cheon et al. |
| 9,098,163 | B2 | 8/2015 | Kuo et al. |
| 9,143,861 | B2 | 9/2015 | Schul |
| 9,213,941 | B2 * | 12/2015 | Petersen .............. G06Q 10/107 |
| 9,247,401 | B2 | 1/2016 | Lauder |
| 9,271,129 | B2 | 2/2016 | Lew et al. |
| 9,307,288 | B2 | 4/2016 | Rouady et al. |
| 9,357,242 | B2 | 5/2016 | Sinha et al. |
| 9,377,876 | B2 | 6/2016 | Ramagen et al. |
| 9,390,724 | B2 | 7/2016 | List |
| 9,438,960 | B2 | 9/2016 | Morris et al. |
| 9,509,954 | B2 | 11/2016 | Huysegems et al. |
| 9,532,104 | B2 * | 12/2016 | Im ...................... H04N 21/4788 |
| 9,566,494 | B2 | 2/2017 | Huston et al. |
| 9,628,296 | B2 | 4/2017 | Libin et al. |
| 9,665,567 | B2 | 5/2017 | Liu et al. |
| 2003/0038893 | A1 * | 2/2003 | Rajamaki ................ A63F 13/12 348/553 |
| 2003/0064807 | A1 * | 4/2003 | Walker .................... G07F 17/32 463/42 |
| 2005/0076362 | A1 * | 4/2005 | Dukes ..................... H04L 29/06 725/46 |
| 2006/0112344 | A1 * | 5/2006 | Ducheneaut ....... H04N 7/17318 715/758 |
| 2007/0220575 | A1 * | 9/2007 | Cooper ................. H04N 7/1675 725/118 |
| 2008/0268929 | A1 * | 10/2008 | Billmaier ................ G07F 17/32 463/4 |
| 2009/0063995 | A1 * | 3/2009 | Baron .................... G06Q 10/10 715/753 |
| 2009/0191929 | A1 * | 7/2009 | Nicora .................... A63B 69/36 463/3 |
| 2009/0322762 | A1 * | 12/2009 | Ilagan ................... G06Q 10/10 345/473 |
| 2011/0083085 | A1 * | 4/2011 | Steelberg ............... G06Q 30/02 715/753 |
| 2012/0036195 | A1 * | 2/2012 | Kennedy ................. H04L 12/18 709/206 |
| 2012/0148033 | A1 * | 6/2012 | Tibbits .................... H04L 51/02 379/88.12 |
| 2012/0185774 | A1 * | 7/2012 | Perlman ............... G10H 1/0008 715/723 |
| 2012/0278825 | A1 | 11/2012 | Tran et al. |
| 2013/0145248 | A1 * | 6/2013 | Friedlander .......... G06Q 10/101 715/230 |
| 2013/0166457 | A1 * | 6/2013 | Du ........................ G06Q 30/01 705/304 |
| 2013/0303268 | A1 * | 11/2013 | Miller ..................... A63F 13/12 463/25 |
| 2014/0189608 | A1 * | 7/2014 | Shuttleworth ........ G06F 3/0484 715/863 |
| 2016/0164927 | A1 | 6/2016 | Naik |
| 2016/0246469 | A1 | 8/2016 | Eidelson |
| 2017/0013579 | A1 | 1/2017 | Stacey et al. |
| 2017/0026796 | A1 | 1/2017 | Pai et al. |

OTHER PUBLICATIONS

Rachel Gawley et al., "SoundBoom: Breaking App Barriers," MobiCASE2011, LNICST 95, pp. 345-348, (2012).

Author Unknown, "How to Use Facebook Messenger," www.wikihow.com/Use-Facebook-Messenger, Jun. 22, 2016 (as recorded by: www.archive.org).

* cited by examiner

COMMUNITY CONTROLLED AUDIO ENTERTAINMENT SYSTEM

This application claims priority under 35 U.S.C § 119(e)(1) to provisional application Ser. No. 62/382,763, entitled "Community Controlled Audio Entertainment System" and filed on Sep. 1, 2016. This application also claims priority under 35 U.S.C § 120 to a similarly titled application filed on Jan. 20, 2017 and assigned Ser. No. 15/411,313.

BACKGROUND OF THE INVENTION

Embodiments of the invention relate generally to an entertainment system, and more specifically to an audio system for entertaining a group of people who are watching a televised sporting event or (other video broadcast), particularly when members of the group are at different locations.

Some sports fans prefer watching televised games with a group of friends so they can exchange comments and "trash talk" about events occurring in the game-commentary and banter that is sometimes more entertaining than the game itself. An entertainment system is disclosed for enhancing the experience of watching video broadcasts by allowing viewers at one or more locations to interact with each other while watching the same video program.

SUMMARY OF THE INVENTION

Embodiments of the invention relate generally to a system and method for allowing multiple viewers of a video broadcast or video multicast (herein "broadcast") to select and send pre-recorded audio messages to each other during the broadcast. One embodiment is for use by friends who are watching a broadcast of a live sporting event from different remote sites—allowing them to exchange their selected audio messages for play through speakers at all sites so they can perceive each others messages without diverting their eyes from the screen. In some embodiments, the audio output of the video program is temporarily muted while each selected audio clip is played.

In one embodiment, users of the system are presented with a menu of pre-recorded audio clips that are pertinent to recent events in the broadcast and to recent comments from other participants. This allows the users to interact more quickly than by drafting and typing text messages—It helps them find and send entertaining quips to their friends in real-time response to recent circumstances, and with minimal distraction from viewing the broadcast.

The menu entries are labeled with corresponding clip-descriptors to aid users in quickly choosing and launching a pertinent audio clip. Preferably the menu dynamically adjusts in response to changed circumstances to offer the users new choices of pertinent or amusing clips, such as previously recorded "canned" comments on selected topics, or well-known audio clips, such as famous lines from movies and television shows.

DETAILED DESCRIPTION OF AN EMBODIMENT

A. System Overview

Figure 1:
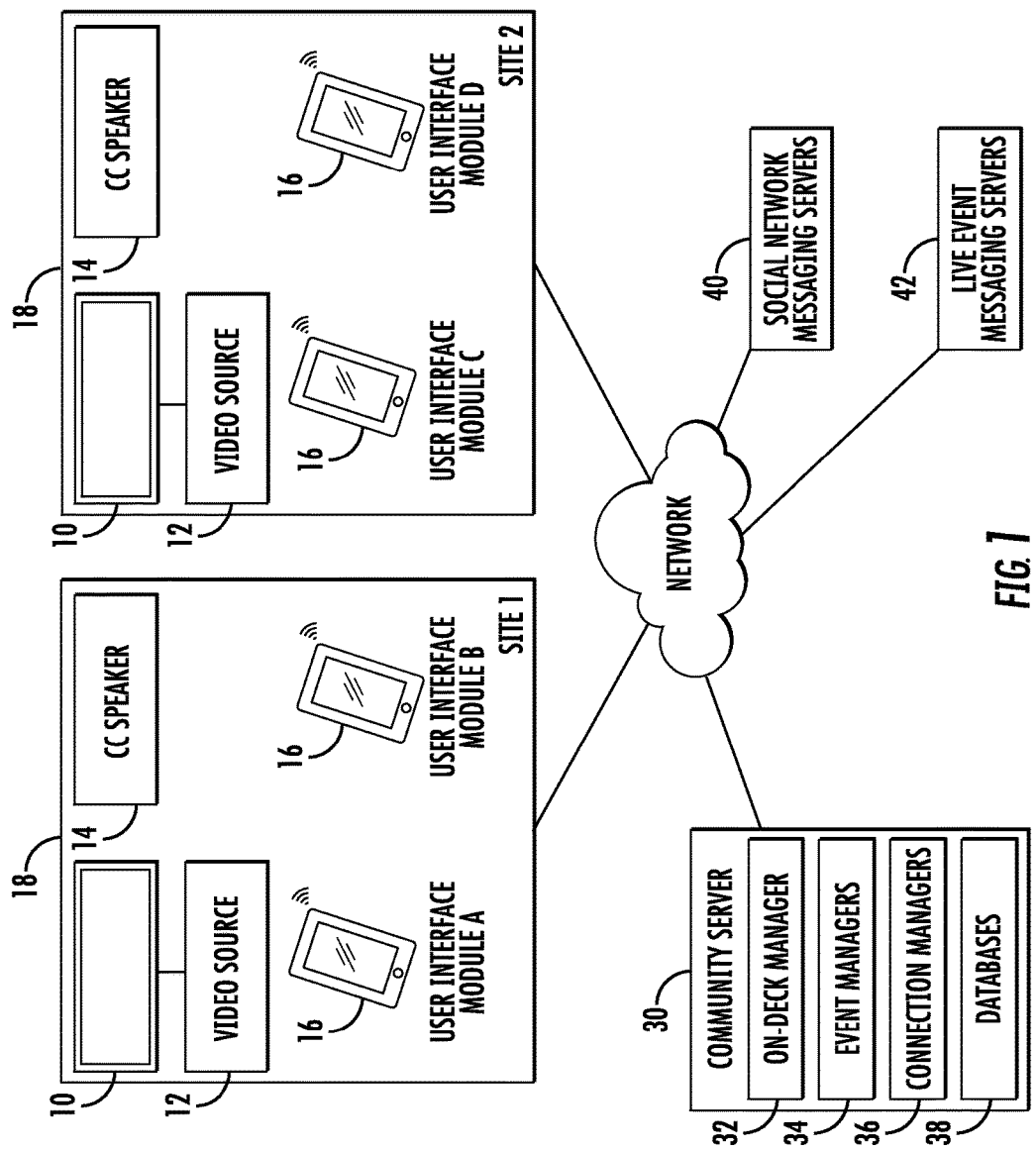
FIG. 1 is a block diagram showing an embodiment of a networked entertainment system.

FIG. 1 depicts a networked entertainment system that includes a local entertainment system 18 at each of a plurality of sites. Each local system 18 includes a display 10 (such as a television or monitor) and a community controlled audio speaker ("CC Speaker") 14 located at the same site. Each display is coupled to a video source ("Video Source") 12 that provides the display 10 with a video of a live performance (such as a football game) or other broadcast video. Video Sources include, for example, interactive TV systems having modems/servers for delivering real-time, multicast video streams, including cable TV systems, Internet and satellite TV.

Each CC Speaker 14 includes an audio speaker whose output is powerful enough to be heard by all persons watching the display at site 1. The content of the audio that is played through the CC Speaker is controlled by a plurality of users (e.g., friends). For example, FIG. 1 depicts a local system at site 1 that supports two local users—one operating User Interface Module A and the other operating User Interface Module B. As explained more fully below, each User Interface Module 16 includes a display that presents to it's user a menu of amusing, pre-recorded audio clips, wherein the menu is filled with audio clips that are pertinent to recent events in the broadcast and to recent exchanges between the users. Each User Interface Module A, B monitors its user's input and, when the user selects an audio clip from the menu, requests local speaker 14 to play the selected clip. If the local Speaker 14 receives multiple, overlapping requests, an arbitration manager selects one for play and discards the other (or buffers it for playing after the prior clip is finished).

The networked entertainment system includes multiple sites that communicate with each other and/or with various servers 30, 40, 42 through a network. Users at each site interact with their respective User Interface Modules 16 to provide input (such as commentary on events observed in a broadcast TV program) for audio reproduction on their local CC Speaker and on their friends' CC Speakers at other sites where the same video program is being shown. The system thus provides a group of friends from various sites with a convenient way to banter and to exchange pre-recorded audio clips about a video broadcast (such as a live sports competition) while they watch the event from different, remote locations.

In one embodiment, when a user at site 1 changes the selected video channel of Video Source 12, a new set of remote users are automatically given access to the site's CC Speaker$_1$, so that only pre-approved friends who are watching the same video program at their respective sites are allowed to control CC Speaker$_1$. (The networked system includes a means for granting selected friends access to a local CC Speaker on a channel-by-channel basis, and a means for notifying the system at site 1 of which channel each friend's remote Video Source is tuned to).

The system includes a Community Server 30 for providing data to the CC Speakers and User Interface Modules at each site, and for assisting in the operation of those Speakers and Modules. The Community Server 30 includes one or more databases 38 that store audio clips, meta-data for the clips, friend lists (with contact information and preferences), and voice profiles for users. It also includes Connection Managers 36 for establishing and managing connections with CC Speakers, User Interface Modules and network servers 40, 42. Community Server 30 also includes Event Managers 34 for determining when certain events have occurred and notifying selected CC Speakers 14 and User Interface Modules 16. Server 30 also has an "On-Deck Manager" 32 for assisting with updating the content of "On-Deck Menus" of the User Interface Modules 16 as explained below.

The Community Server 30 and/or the plurality of CC Speakers 14 include modules for coupling to and receiving messages or streams from one or more social network messaging servers 40 (such as those of Facebook, Twitter et al.) and for converting those messages into audio clips for playback on selected CC Speakers. These modules preferably include a text-to-speech synthesis engine and voice profiles for use with the speech synthesis engine to convert text messages into audio clips with a "voice" chosen by the subscriber.

Figure 2:
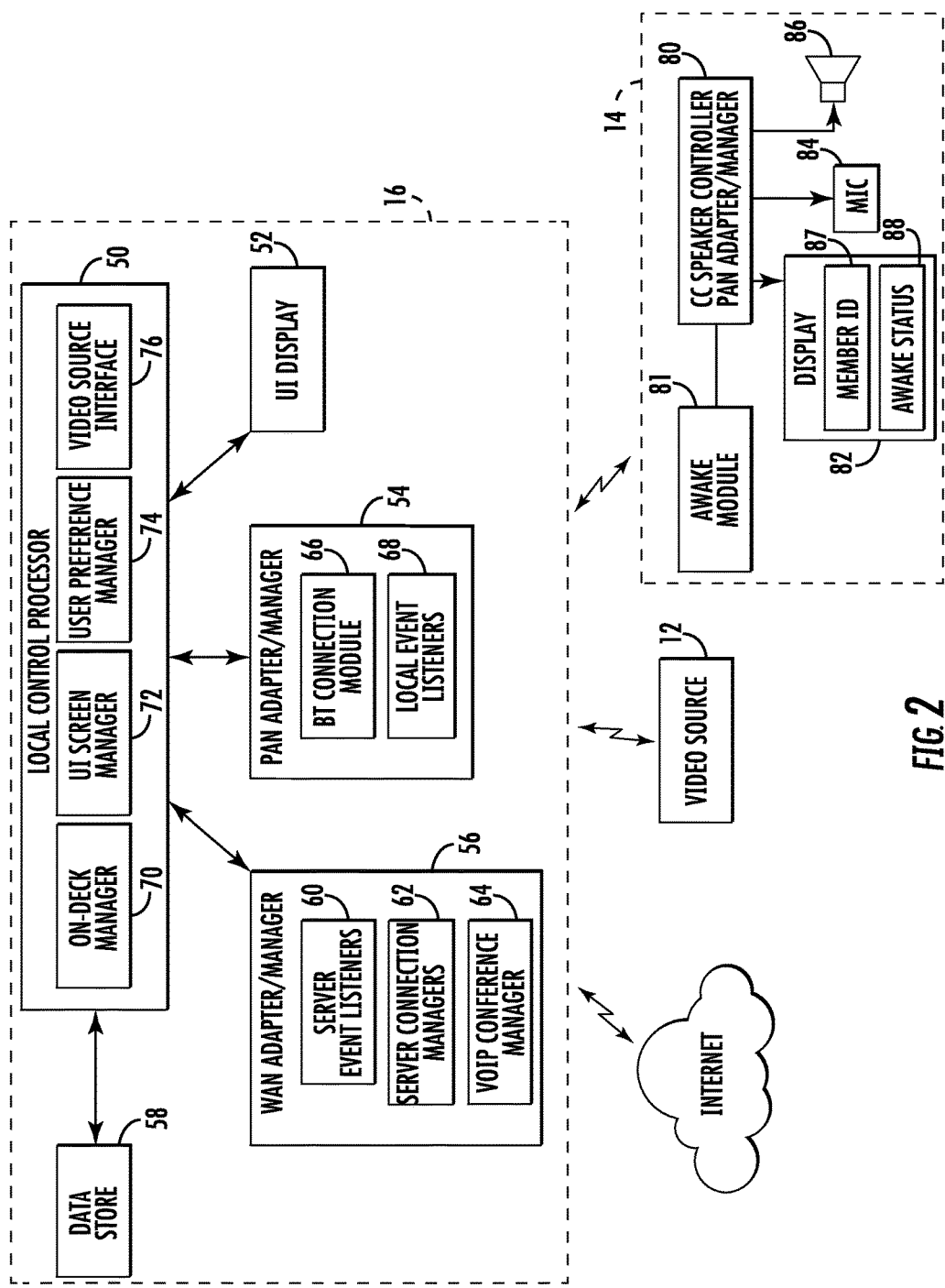
FIG. 2 is a block diagram showing an embodiment of a User Interface Module and a community controlled audio speaker ("CC Speaker") for use in the networked entertainment system of FIG. 1.

FIG. 2 depicts a block diagram of an embodiment of a local User Interface Module 16 paired with a CC speaker 14 and with a Video Source 12. The CC Speaker 14 includes one or more acoustic speakers 86 (e.g., electromagnetic transducers, piezoelectric transducers or any other type of audio transducer) for emitting sound into the room where the display 10 (FIG. 1) resides. It also includes a microphone system 84 for receiving voice commands, monitoring the audio output of Video Source 12, and for use with the system's voice conferencing feature.

A display window 82 includes, inter alia, a window (view) 87 that provides a name, photo, avatar, and/or other indicia that identifies the user who currently controls (or most recently controlled) the audio output of CC Speaker 14. For example, if the CC Speaker is playing audio in response to input from a given user, the view 87 depicts an identifier of that user. In integrated implementations (wherein the CC Speaker 14 and Display 10 are integrated), the window 82 can appear within the screen of Display 10, but at a location and with a size that does not distract from the video program.

The CC Speaker includes an Awake Manager 81 that determines when the CC Speaker is active or "awake" (meaning that it plays audio in response to requests), and when it is silent and non-responsive to requests. The Display 82 includes an additional view 88 that provides an indication of whether the CC Speaker 14 is awake. The CC Speaker can also issue a distinctive sound to announce when it awakens.

A Speaker Controller 80 controls the operation of the CC Speaker 14, including microphone system 84, display window 82, and an integral personal area network ("PAN") manager for managing communications with the local User Interface Module via Bluetooth. The PAN manager preferably implements a Bluetooth Adapter/Stack customized with functionality for implementing the features of the CC Speaker, such as detecting and pairing with User Interface Modules 16. Other short-range wireless protocols, such as Zigbee or Z Wave, can be can be used for communicating with devices at the local site.

B. User Interface and User Operation

User Interface Modules 16 can be implemented with smart phones, pad computers and/or other user-operated devices. The User Interface Modules typically include a touch screen display for interacting with a user. They also include one or more processors and communication facilities for communicating locally with the CC Speaker and Video Source and communicating off-site via WIFI/Internet.

More specifically, referring to FIG. 2, User Interface Module 16 includes a touch screen UI Display 52 for interacting with a local user, and a PAN Manager 54 for short-range communication with the CC Speaker 14 and Video Source 12. The PAN manager includes a Bluetooth connection module 66 for pairing with the CC Speaker 14 and Video Source 12. It also includes "Local Event Listeners" 68 for monitoring and reacting to various local events, such as a change of the video channel of Video Source 12, the arrival and departure of local User Interface Modules to/from the site, and input from microphone 84.

A WAN manager 56 preferably manages the User Interface Module's communications with an Internet router at the site and is customized with functionality for implementing system features, such as Server Event Listeners 60, Server Connection Managers 62, and VoIP Conference Manager 64. The Server Connection Manager preferably includes one or more modules for establishing connections with or otherwise communicating with the Community Server 30 and Social Networking Servers 40 (such as Facebook's messaging servers, Twitter's servers and/or others).

The User Interface Module includes Data Store 58, and a local control processor 50 that manages several operations, and includes an On-Deck Manager 70, a UI Screen Manager 72, a User Preference Manager 74, and A Video Source Interface 76. While these modules reside within the User Interface Module of FIG. 2, in other embodiments of the system these modules can be implemented in Server 30 and/or CC Speaker 14.

Data Store 58 is a non-volatile memory, such as flash memory, that stores software and data required for implementing the functions of User Interface Module, and can include a local database of audio clips similar to database 38 on Community Server 38, or in lieu of database 38.

The UI Screen Manager 72 generates UI screens that interact with users for configuring and operating the CC Speaker system, such as for example: 1) receiving a user's input for user preferences and for configuring the system, 2) navigating a Friend-Group TV program guide, 3) controlling the audio output of a local CC Speaker 14, and 4) communicating with remote CC Speakers.

When a user at site 1 activates a User Interface Module 16 (e.g., User Interface Module A), the User Interface Module's Bluetooth adapter 54 searches for and pairs with the CC Speaker at the site 1, herein "CC Speaker." Preferably, the User Interface Module can also pair with the Video Source 12 at site 1 for Bluetooth communications. If the local CC Speaker 14 and Video Source 12 are integrated, the integrated device may behave as a single Bluetooth device.

1. Channel Selection Using Friend-Group Program Guide

Figure 3:
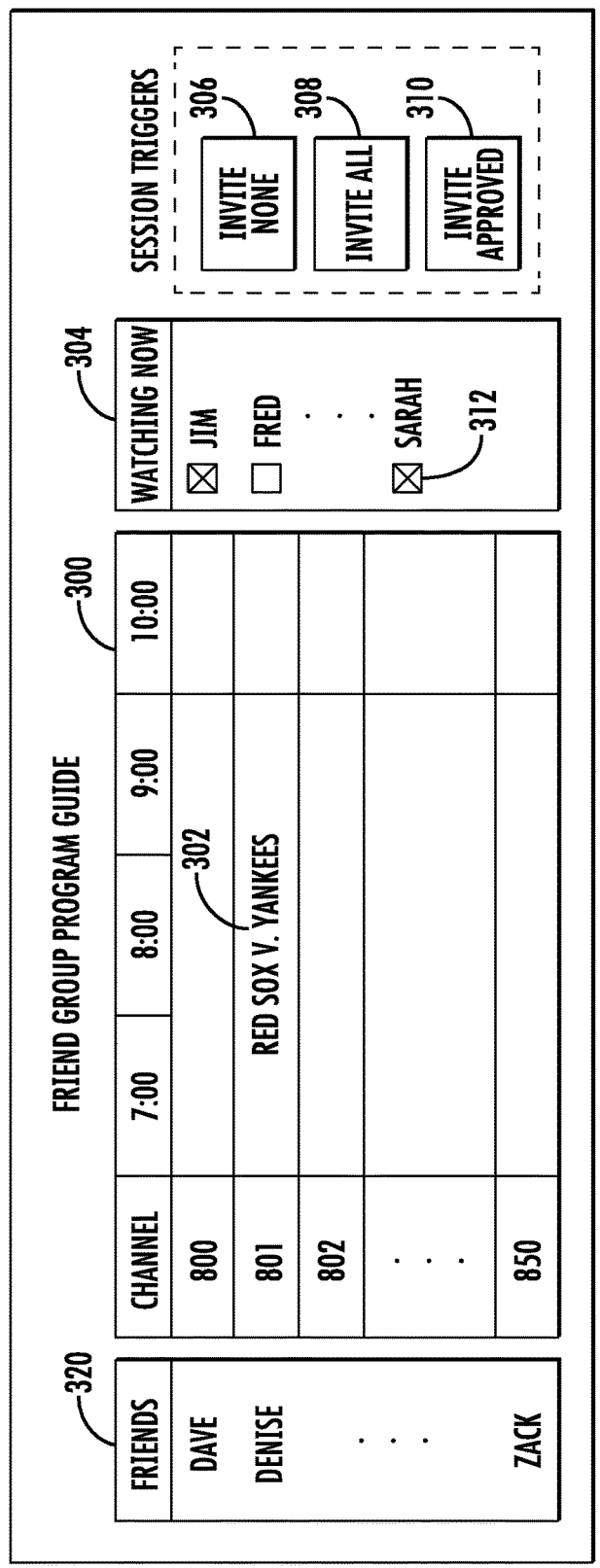
FIG. 3 shows an embodiment of a user interface ("UI") screen of a "Friend-Group Program Guide."

FIG. 3 depicts a "Friend Group Program Guide" for display on the site's screen 10 and/or on the User Interface Module display 52. The Friend Group Program Guide includes a program pane (or view) 300 that displays a scrolling list of available video programs.

The Friend Group Program Guide also includes a pane 320 that lists all of the Local User's friends, and highlights the names of those who are currently watching TV. If the Local User clicks on a friend's name in pane 320, a cursor in adjacent program pane 300 jumps to a cell in the program guide corresponding to the program that this friend is currently watching. This feature assists the Local User in finding a video program for which the Local User can initiate a CC Speaker session with friends.

When the cursor is placed in a particular cell of the program list 300 (e.g., cell 302 for the Red Sox v. Yankees game at 7:00 PM), the Friend Group Program Guide populates an adjacent pane 304 with a list of the user's friends who are currently tuned to that program (the "On-Channel Friends"). (In some embodiments, pane 304 also lists those who previously registered as interested in participating in CC Speaker Sessions for that program, with an indication of whether those registered friends are currently on-channel). The system obtains this information in any of a variety of ways that are within the skill of those in the art, such as communications via the Internet with Community Server 30 and/or peer-to-peer communications with the Friends' respective Video Sources, User Interface Modules or CC Speakers.

In a server based implementation, the local system 18 at site 1 (FIG. 1) notifies Community Server 30 of the site's currently selected video program and of the identity of each User Interface Module at site 1. Community Server 30 gathers this information from all sites and re-distributes it to each system 18 for use with that site's Friend Group Program Guide. This server-based approach can be implemented using the Extensible Messaging and Presence Protocol ("XMPP"). Again, those skilled in the art will recognize that this functionality could also be provided using a peer-to-peer implementation.

Referring again to FIG. 3, an indicator 312 next to each person's name in pane 304 shows whether that user is pre-approved for CC Speaker Sessions. If the indicator is checked, that person is pre-approved for CC Speaker sessions for the video program shown in the cell 302 of pane 300 where the cursor is currently pointed. Each indicator 312 operates as a toggle button: The Local User can add any of the On-Channel persons to the pre-approved list or remove any from the list by toggling indicator 312 to a desired setting. The system remembers these choices in a pre-approval list such as shown in a simple example below:

| Video Program P | Pre-Approved Friends (P) |
|---|---|
| P = NE Patriots vs. NY Jets | Name 1, Name 2, . . . Name N |
| P = Pittsburgh Steelers v. Kansas City Chiefs | Name i, Name ii, . . . Name I |
| P = Talk Show "X" | Name a, Name b, . . . Name X |

Therefore, each time a user navigates to a particular cell in program guide 300, the status of indicators 312 in pane 304 are set to a state specified in a pre-approval list that is saved in Data Store 58 (in the local User Interface Module) and/or in database 38 of Community Server 30.

The Friend Group Program Guide includes a set of three buttons 306, 308, 310 for allowing the Local User to instruct the Video Source 12 to "tune" to a selected program and initiate a CC Speaker Session for that program.

2. Initiating a CC Speaker Session Using a Friend-Group Program Guide

The operation of buttons 306, 308, and 310 are summarized below:

| Button | Function |
|---|---|
| 306 | Select program but send no CC Speaker Invitations. |
| 308 | Select program and send CC Speaker invitations to all friends currently watching the program. |
| 310 | Select program and send CC Speaker invitation only to pre-approved friends. |

The first button 306, when touched, instructs the Video Source 12 to "tune" to the video program pointed to by the cursor (here, cell 302 for the Red Sox v. Yankees game at 7:00 PM), but does not initiate a CC Speaker Session. The other buttons 308, 310 are "Session Triggers" for initiating and joining CC Speaker Sessions. When the user touches button 308, the system tunes Video Source 12 to the selected video and also sends invitations to all friends in pane 304, asking them to join a CC Speaker Session for that program. (If a session was previously initiated with this group, the local CC Speaker re-joins the on-going session). Similarly, button 310 tunes the Video Source to the desired channel, but sends invitations only to "pre-approved" friends (i.e., those whose indicator box 312 is checked). This allows the user to be more selective as to which On-Channel Friends to include in each CC Speaker Session.

Figure 4:
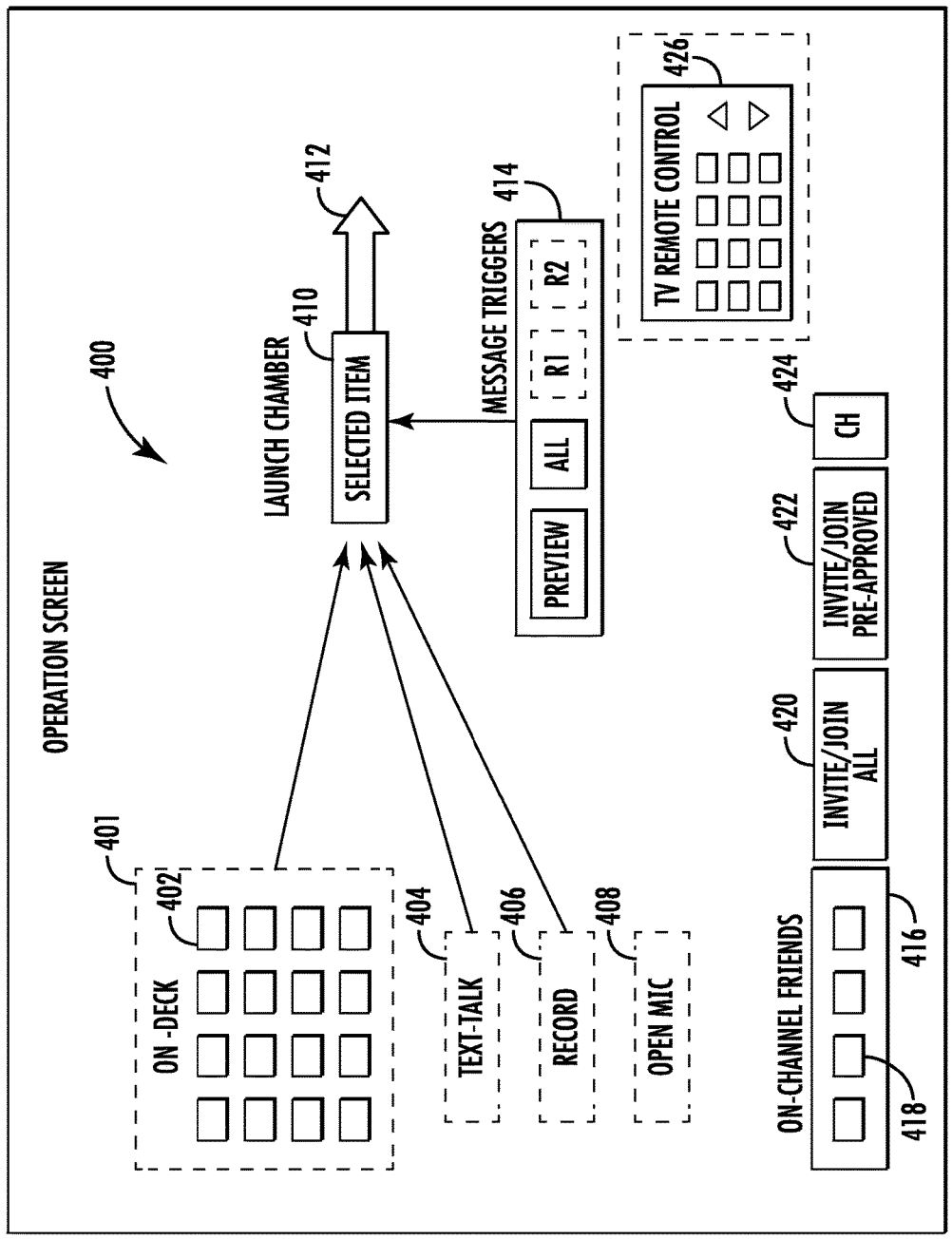
FIG. 4 shows an embodiment of a UI screen of a User Interface Module for use in operating a CC Speaker and sending audio clips to selected members of the user's friend group.

When the user initiates a CC Speaker Session with buttons 308, 310, the User Interface Module's display 52 switches to a different UI screen 400 shown in FIG. 4. This screen 400 interacts with the User to allow the user to participate in the active session.

3. User Operation of Interface Modules During CC Speaker Session

FIG. 4 depicts a display screen 400 of a User Interface Module for allowing the user to interact with friends in the current session via their associated CC Speakers. In general, screen 400 allows the user to launch audio and visual messages to remote CC Speakers of all participants in the session.

In another embodiment, screen 400 or a similar screen is displayed within Display 10 adjacent to a region where the video program is being shown. In this embodiment, one or more users can navigate the screen 400 to launch audio and visual messages.

The screen 400 includes several panes from which a user can pick audio or visual messages for distribution to session participants. For example, pane 401 contains a scrolling list of sound clips available for selection by the user, wherein the menu of clips is tailored to the user's preferences (the "On-Deck" sound clips). The content and arrangement of the On-Deck menu 401 are controlled by On-Deck Manager 70 (within the User Interface Module, FIG. 2) in collaboration with the On-Deck Manager 32 of Community Server 30 (FIG. 1). (However, in another embodiment, the On-Deck Manager 70 controls the On-Deck menu 41 locally, without interaction with Server 30).

Another pane 404 contains a text button that, when touched, creates a UI fragment (window) on the screen that accepts the user's typed messages. In embodiments having a speech synthesis module, the text messages are converted to an audio clip. One skilled in the art will recognize that the speech synthesis module can reside at various locations in the system, as long as the speech is ultimately available in audio format for play on speakers 86. Other embodiments send the text message to all session members for display on their User Interface Modules and/or in a window on their Displays 10.

A third pane 406 is a "voice record" button that, when pressed, creates a UI fragment or window that prompts the user to speak into a microphone in the User Interface Module 16 to record a custom audio clip (or into the microphone 84 of CC speaker 14). Lastly, a fourth pane 408 is an "Open Mic" button that instructs the system to establish a voice channel (or to open an existing voice channel) with the CC Speakers of each session member. For example, the voice channels can be implemented using the Voice Over IP manager ("VOIP" Manager") 64 of the User Interface Module in collaboration with the Connection Managers 36 of Server 30.

Each entry 402 in On-Deck pane 401 is a virtual button that displays an indication of the type of sound in the clip and the clip's duration. For example, a clip authored by a famous comedian would be identified by descriptive text and/or an icon that provide the Local User with sufficient information to quickly recognize the clip's author and the content of the sound clip. This indication assists the user in rapidly finding in the menu an appropriate clip that is responsive to events appearing on the TV screen or to commentary recently played through speaker 86.

The Local User can also preview a sound clip with the User Interface Module 16 before launching it. For example, a User Interface Module control pad can include a speaker or earpiece for playing the clip at a relatively low volume and at an accelerated pace to allow the Local User to preview the clip before launching. A text synopsis of the clip can also be displayed for preview.

When the user touches the button 402 of a desired sound clip, the User Interface Module loads the clip's identifier into a "Launch Chamber Pane" 412. This clip identifier provides sufficient information for the user to recognize the chambered clip and to confirm the selection. The user can also drag multiple items from menu 401 into the launch chamber, effectively teeing up a succession of clips.

Similarly, when the user enters a message via the Text Box 404 or the Record Button 406, the Launch Chamber Pane 410 is loaded with a corresponding indicator for confirming the selection.

A Message Trigger Pane 414 contains one or more trigger buttons for launching the chambered items, and a "Preview" button for previewing the chambered items as mentioned above. The "All" button instructs the system to send the chambered items to all session members. To confirm that the launch occurred, a Launch Indicator 412 is briefly displayed (e.g., with a "Toast" object in Android based systems).

In some embodiments, the Message Trigger Pane 414 contains additional trigger buttons for sending the chambered item to only certain members of the session, such as a reply message intended only for the author of the most recently received message. For example, when an audio message arrives at site 1 from a remote user "R" and is played through the local CC Speaker 14, the Trigger Pane 414 in each local User Interface Module 16 adds a Reply Button R1. When the Reply Button R1 is touched (or otherwise actuated), it causes the system to launch the chambered item to only user R and to briefly display a corresponding Launch Indicator 412 to confirm the launch. (Preferably, all launched audio clips are also played on the local CC Speaker). Similar Reply Buttons R2 can be added for other recently played items to allow a local user to reply to other recent commentary without broadcasting the response to all members of the session.

The reply buttons appear in the order in which their corresponding incoming messages arrived. The Reply Buttons are preferably limited to only relatively recent messages, such as the three most recently received comments, or comments made within the last minute or so. Each reply button includes an indicator that identifies the author of the incoming message (i.e., the reply target) and of the nature of the incoming message (e.g., the clip identifier or descriptive text). The reply buttons are effectively a log of recent incoming messages.

The All Button and Reply Buttons are simultaneously displayed to allow the user to quickly choose between the available distribution options for the chambered clip, but each reply button disappears once it is used.

In one embodiment, UI screen 400 allows the user to hop between multiple CC Speaker Sessions. For example, screen 400 also includes a channel select button 424 for invoking a UI fragment 426 that operates as a TV remote control for prompting a user to select a new video channel. UI Screen 400 also includes an "On-Channel Friends" pane 416 that, like pane 304 of the program guide (FIG. 3), shows the identity of all friends tuned the currently selected channel, and indicates which of those friends are pre-approved for CC Speaker Sessions. For each friend who is tuned to the currently selected video program (On-Channel Friends), the pane 416 includes an identifier button 418 with an avatar and/or a name of the friend. Each identifier button operates as a toggle switch that adds and removes that friend from the pre-approved list for the current channel, as described above for pane 304 in FIG. 3: When the user touches a button 418, it toggles between an "approved" state and an "un-approved" state. For example, buttons in the approved state are colored green, and buttons in an unapproved state appear in red.

When the user operates TV remote control panel 426 to tune video source 12 to a new video program, the On-Channel Friends panel 416 updates to show friends who are currently watching that same video, and each button 418 is colored to indicate which friends are in a pre-approved state for that channel. If a session already exists for the channel (for example, if the user arrived at screen 400 by actuating a session trigger 308, 310 of FIG. 3), then the On-Channel Friends pane is displayed with emphasis to indicate that a session is active. Otherwise, it is displayed faintly to indicate that a session is not active.

To allow the local user to activate a CC Speaker Session from UI screen 400, the screen includes Session Triggers 420, 422 that operate like Session Triggers 308, 310 in FIG. 3: Session Trigger 420 invites all On-Channel Friends to initiate a session (or joins an existing session of those friends), and Session Trigger 422 invites only "pre-approved" friends (or joins an existing session with that group).

Configuration of On-Deck Menu.

On-Deck Managers 70, 32 (FIGS. 1, 2) allow the user to populate the On-Deck menu 401 with clips picked from one or more databases of audio clips, such as database 38 on Community Server 30. The On-Deck menu includes clips manually pre-selected by the user, as well as some that are automatically added to the menu based upon a variety of parameters. In some embodiments, the menu dynamically adjusts during the CC Speaker Session in response to real-time changes in circumstances. The goal is to help the Local User quickly find relevant audio clips while watching the video program, so that the user can react "on the fly" to events in the video program and to incoming banter from members of the CC Speaker Session.

Parameters that influence dynamic adjustments to the menu include the identity of the local user, the local user's preferences, and the context of current circumstances ("Session Context"). The Session Context includes parameters and circumstances that could influence the local user's choice of an interesting audio clip. For example, aspects of a Session Context include: 1) the identity and genre of the particular program P that the local Video Source is currently showing, 2) the occurrence of events in that video program, 3) the identity and preferences of participants in the current CC Speaker Session, and 4) the content of past exchanges between participants of the session.

The menu preferably updates each time the user changes the video program output by Video Source 12. If the user switches the Video Source 12 to a channel carrying a football game, the system automatically adds sound clips to the On-Deck menu 401 that relate to the teams and players in that game, and/or re-arranges the clips in the menu to make such clips more prominent. If the user has a known preference for one team or hostility towards another, the system can populate/arrange the On-Deck menu with clips favorable to the preferred team and adverse to the other. Similarly, the user's preferences for players can be used to automatically add/arrange related sound clips to the On-Deck collection.

Events in the video program can also trigger adjustments to the menu. For example, when a team scores a goal or when a player gets ejected, the menu can be updated with clips pertinent to those events. Community Server 30 includes an Event Manager 34 that monitors video programs (and related metadata). Event Manager 34 also listens for messages from Live Event Messaging Servers 42 (such as commercially available real-time data feeds for sports data) to detect the occurrence of pre-determined events of interest. Upon the occurrence of such events, Community Server 30 sends notifications of the events to corresponding On-Deck Managers 70 of all participants in the CC Speaker Session, prompting the local On-Deck Managers 70 to update their On-Deck menus 401. In some embodiments, On-Deck Manager 32 of Community Server 30 automatically sends audio clip updates to each local On-Deck Manager 70 for inclusion in their On-Deck Menus 401, wherein the clips are selected for each user based on the recent events and on the Community Server's knowledge of that user's preferences.

The menu can also adjust in response to the content of incoming or outgoing messages. The system monitors the content of all incoming and outgoing messages during a CC Speaker Session and in response to certain key words or concepts in the message, updates the menus 401 with pertinent clips, taking into consideration the identity of the person who issued the message, the history of that person's prior clip selection, and the history of the local user's prior clip selection. For example, Community Server 30 maintains preference data for each user in database 38, including preferences explicitly stated by each user during configuration and preferences inferred from the genre and content of each user's previously selected clips and texts.

The menu 401 can also adjust in response to draft text messages as they are being entered via pane 404. As the user drafts a message in pane 404, the system monitors the draft and updates pane 401 with clips pertinent to the content of the draft. The user can pick an audio clip from the menu instead of the text message or can integrate clips with the text message.

Audio Clip & User Preference Databases 38

The databases 38 preferably include clips that are tagged or indexed with a variety of parameters, such as the name of the author, the subject of the clips' content, and other metadata, including each user's prior selection of the clips. Each user can pre-record "canned" audio clips for storage in the database in anticipation of upcoming events. Such recordings include amusing, sarcastic commentary and criticism, such as the fun banter or "trash talk" that athletes and fans sometimes exchange during friendly competition. For example, the database can include pre-recorded clips from well-known comedians, celebrities, or from the users of the User Interface Modules. Clips created during a CC Speaker Session using buttons 404, 406 (FIG. 4) can also be automatically added to the database 38.

Audio Clip Database 38 is preferably a structured, relational database, in which each clip is indexed (or linked) with parameters used to automatically locate relevant clips. Document databases, such as XML databases, can also be used.

A simple example of some audio clips and some associated parameters are shown in the table below (wherein * is a sarcasm score, and "sport" identifies any related sports):

| ID  | Cat         | Title        | Genre   | Speaker   | Sport    | *  | Key Words           |
|-----|-------------|--------------|---------|-----------|----------|----|---------------------|
| x01 | Movie       | Few Good Men | Drama   | Nicholson | 0        | 8  | "Can't Handle Truth" |
| x02 | Movie       | Taxi         | Drama   | Deniro    | 0        | 7  | "Talkin to me?"     |
| x03 | Movie       | Slapshot     | Comedy  | Martin    | All      | 5  | "We're Losin!"      |
| x04 | Movie       | Slapshot     | Comedy  | Newman    | Hockey   | 6  | "Old Time Hockey"   |
| x05 | Movie       | Gladiator    | Drama   | Crowe     | All      | 7  | "Are You Not Entertained" |
| .   | .           | .            | .       | .         | .        | .  | .                   |
| .   | .           | .            | .       | .         | .        | .  | .                   |
| x06 | TV          |              | Cartoon | Silvester | 0        | 10 | "Sufferin Succcotash" |
| x07 | TV          |              | Cartoon | Bugs      | 0        | 5  | "What's Up Doc"     |
| x08 | TV          |              | Cartoon | Mickey    | Baseball | 5  | "Hot Dog"           |
| .   | .           |              | .       | .         | .        | .  | .                   |
| x09 | Comedian    |              | Adult   | DiceClay  | 0        | 9  | New York,"Oh"       |
| x10 | Celebrity   |              | Adult   | DavidOrtiz| Baseball | 0  | Boston, "Our F'in City" |
| .   | .           |              | .       | .         | .        | .  | .                   |
| x11 | Sound Effect| Failure      | Comedy  | 0         | 0        | 10 | Wrong Buzzer        |

-continued

| ID | Cat | Title | Genre | Speaker | Sport | * | Key Words |
|---|---|---|---|---|---|---|---|
| x12 | Sound Effect | Bomb | All | 0 | 0 | 5 | Explosion |
| x13 | Sound Effect | Horn | Sport | 0 | Hockey | 0 | Goal |
| . | . | . | . | . | . | . | . |
| . | . | . | . | . | . | . | . |
| x14 | Personal | | Sport | User0001 | Baseball | 10 | Yankees, Hate |
| x15 | Personal | | Sport | User0002 | Baseball | 10 | Red Sox, Hate |

Each user can create an account within a User Preference Database 38 and pre-configure it with the user's preferences that correlate with the database tags. This facilitates automatically populating the On-Deck menu with sound clips from Audio Clip Database 38. A simple example of user preferences is shown below, wherein certain user preferences are scored on a scale of zero to ten:

| User | Age | Sex | Loc | Hockey | FBall | BBall | Socr. | Teams | Players | Enemies |
|---|---|---|---|---|---|---|---|---|---|---|
| X01 | 54 | M | Boston | 9 | 10 | 7 | 0 | Sox, Pats, Bruins | Pedroia Brady | Yankees Orioles Jets |
| X02 | 21 | M | NY | 7 | 9 | 3 | 5 | Jets Rang. | | Pats Brady |
| . | . | . | . | . | . | . | . | . | . | . |
| X0n | 37 | F | Seattle | 0 | 8 | 4 | 4 | SHs | Wilson | Pats |

C. Communications and System Operations

In server-based implementations, each User Interface Module communicates the user's inputs to the Community Server 30. The Community Server 30 interacts with the appropriate CC Speakers and/or other User Interface Modules via the Internet or other network to deliver the data needed for each CC Speaker to play the selected clips and text.

In peer-peer embodiments, User Interface Modules communicate directly with their local CC Speaker 14 via a Bluetooth® connection, and with remote CC Speakers (and/or User Interface Modules) via a WAN. For example, multiple User Interface Modules can connect with the local CC Speaker 14 in a Bluetooth piconet. Other short-range wireless technologies can be used to connect a local User Interface Module with the CC Speaker 14, such as WIFI, Zigbee and Z Wave.

The User Interface Modules communicate with remote CC Speakers over a WAN via a WIFI router at the site. In one embodiment, each local User Interface Module acts as a conduit for delivering communications from remote User Interface Modules to the local CC Speaker 14. For example, a remote User Interface Module can send a remote user's selections to a local User Interface Module (e.g., via text, email, tweet messages, or other message service), where the local User Interface Module processes the messages and sends corresponding local control signals to the local CC Speaker 14 via the Bluetooth link.

Regardless of the chosen mechanism for the system components to exchange data, the system allows remote members to provide commentary or "trash talk" during show time to selected friends and followers. The commentary and trash talk are then submitted for play on all corresponding CC Speakers within the CC Speaker Session (albeit in competition with the audio submissions of others who compete for access to the same CC Speakers).

Figure 5:
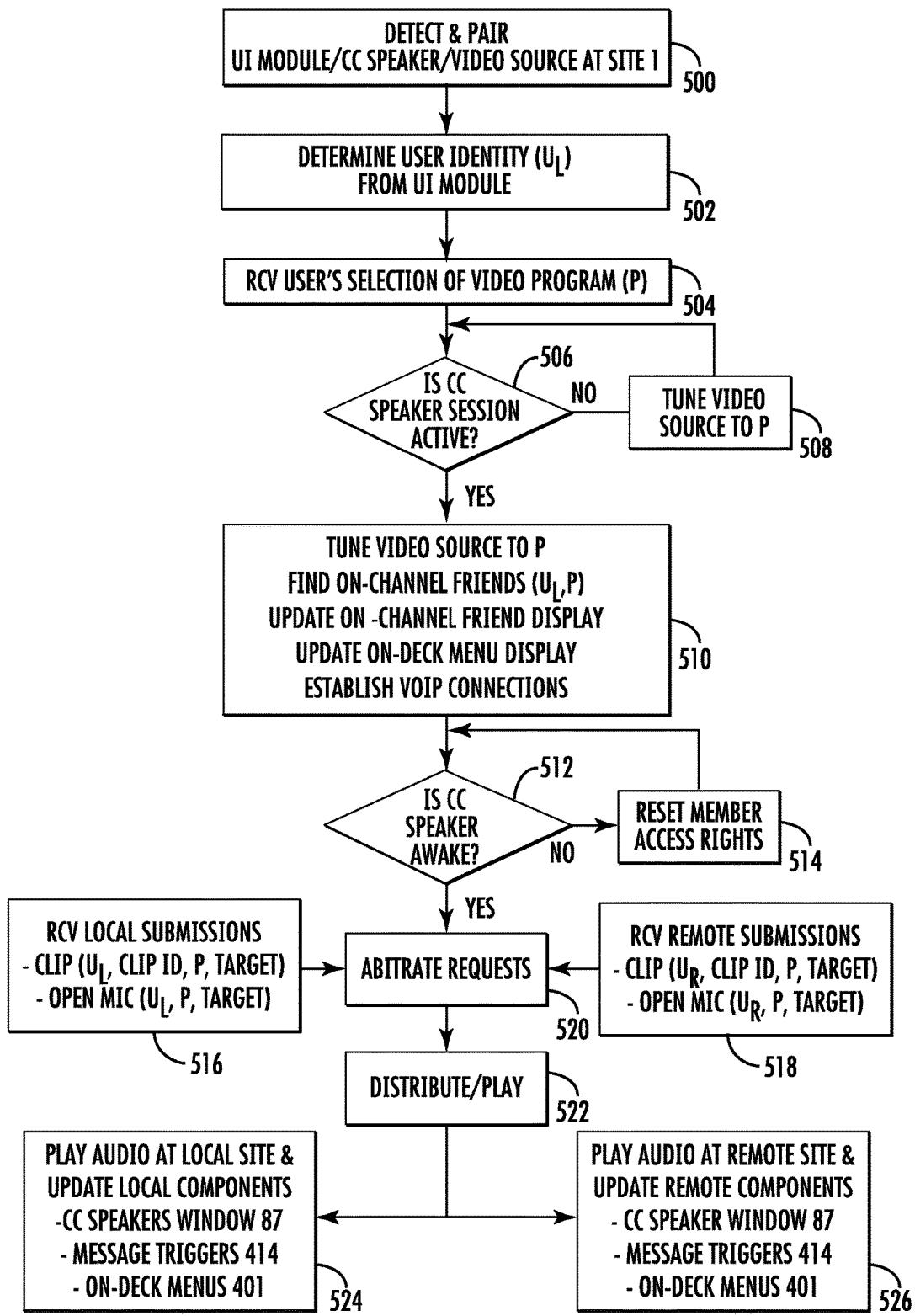
FIG. 5 is a flow diagram of operations for controlling certain features of CC Speakers and User Interface Modules.

FIG. 5 depicts several basic system operations implemented by the networked entertainment system. Those skilled in the art will recognize that the system can implement these functions via a collaboration of the User Interface Modules, CC Speakers, and the Community Server 30, and that they have a choice as to the role of each component.

At site 1, when the user activates a local User Interface Module, it detects and pairs with the local CC Speaker 14 and Video Source 12. (Operation 500). For example, if the User Interface Module is Bluetooth enabled, the CC Speaker, Video Source, and User Interface Module discover each other, then pair and bond.

The identity of the local user $U_L$ is determined from the User Interface Module and sent to the Community Server 30 along with an indication of the user's location. (Operation 502). The local User Interface Module (and/or CC Speaker) interact with Video Source 12 to determine the identity of the current program at site 1, herein "P." (Operation 504). In some embodiments, they also begin listening for the occurrence of other events that influence operations, such as notifications that certain events have occurred in the current video program. Such notifications can be provided by Community Server 30 or any other servers 40, 42.

When the user picks a channel P for the Video Source 12 (but elects not to request a CC Speaker Session), the Video Source tunes to the selected program and the system sends no invitation or request to join a CC Speaker Session. (Operations 506, 508)

If the user instead indicates a desire to initiate a CC Speaker Session or to return to an existing session (e.g., with buttons 308, 310), the system tunes Video Source 12 to the selected video program and updates the local CC Speaker and User Interface Modules accordingly. (Operation 506, 510): For example, the display screen 400 of User Interface Module adjusts to any change in the selected video program. More specifically, the system tracks which friends are on-line and tuned to the currently selected video program. The system also determines each friend's pre-approval status for program. The On-Channel Friends 416 displayed by User Interface Module is regularly updated with the most current information. Similarly, using the On-Deck preferences of the user of User Interface Module, the system updates On-Deck panel 401 when the channel changes.

The CC Speaker includes an Awake Manager 81 (FIG. 2) that is designed to limit times when the CC Speaker is available to emit audio, to prevent overuse of the speaker that could annoy rather than entertain. (Operation 512). For example, the module can include a timer that activates the CC Speaker for a brief window of time (e.g., a minute). When the window opens, an Awake Manager notifies the display control module 82 (FIG. 2), which in response displays an indication 88 (FIG. 2) to the local users that the speaker is awake. The Awake Manager can also emit an audio notification that the CC Speaker is awake via the CC Speaker's speaker 86. In networked embodiments, the system coordinates all CC Speakers in the session. For example, Community Server 30 includes an Awake Manager that sends awake notifications to all local Awake Managers 80 in a session.

The Awake Manager can be configured to mute the audio of Video Source 12 when it plays audio on CC Speaker 14. In embodiments wherein the CC Speaker and Video Source are integrated, the Awake Manager has direct control over the audio of Video Source 12. But in other embodiments, the Awake Manager includes an IR transmitter for remote control of the Video Source's audio via a wireless "mute" signal.

The Awake Manager can also open an Awake window upon the occurrence of certain events in the current TV program, such as a score, a missed scoring opportunity, a player ejection or other event. The Awake Manager can also close an Awake window upon the occurrence of an event such as a commercial interruption of the TV program. Notifications of such events can be supplied from one or more remote servers networked with the CC Speaker, such as Live Event Messaging Servers 42. Some events can also be determined by image or audio analysis of the video program or by monitoring any metadata that is supplied with the video program. For example, a commercial break can be detected from changes in the content of the video program.

The nature of the video program can be used to determine the timing of Awake windows. For example, if the video program is a dramatic movie, participants may only want to banter during commercial breaks. For such programs, the Awake Manager awakens the CC Speakers only during commercial interruptions in the video program, so that friends can watch the video program in peace, but can interact with each other and comment during the commercial breaks.

During the period when the CC Speaker is asleep, the system interacts with the User Interface Modules of all members of the CC Speaker Session to determine which of those members will be allowed access during the next awake window, and to select the order in which they will be ranked for purposes or resolving overlapping requests. (Operations 512, 514). For example, in one embodiment, each user must qualify for access to the CC Speaker by correctly answering trivia questions. In this embodiment, before the CC Speaker re-opens an Awake Window, each User Interface Module displays a sports trivia question, and only those who answer correctly will be awarded access to the CC Speaker 14 during the next window. The trivia questions and answers can be supplied by the Community Server 30 (with the questions tailored to the subject matter of the video program), thus allowing the users to compete for access to the CC Speaker and to raise their priority level.

In one embodiment, a video program sponsor supplies the questions. The questions (or other prompts) operate as an interactive advertisement for the sponsor's product. Participants are motivated to respond to the prompts so they can earn access to the CC Speaker when it next awakens.

In another embodiment, the users compete with each other in a multiplayer game running on their User Interface Modules during periods when the CC Speaker is asleep, to thereby determine which of the users will win access to the CC Speaker when it next awakens, or to determine their place in the priority hierarchy.

During the period when the local CC Speaker is awake, the system receives requests from local User Interface Modules (e.g., User Interface Modules A, B, FIG. 1) and requests from one or more remote User Interface Modules at remotes sites (e.g., User Interface Modules C, D, FIG. 1). (Operations 516, 518). Each request includes a plurality of parameters used to process the request. For example, a clip request can be tagged with the identity of the requesting User Interface Module ($U_L$), a clip identifier (ClipID), a video program identifier (P), and the identity of all intended targets (TargetVector), as illustrated in the example below:

ClipReq ($U_L$, ClipId, P, TargetVector)

Similarly, an OpenMic request can specify parameters needed to process the request, e.g., OpenMic ($U_L$, P, TargetVector). The clip identifier can include metadata describing the content of the clip for use in managing updates to the on-deck menus.

One or more Arbitration Managers listen for requests from all User Interface Modules in the CC Speaker Session and arbitrate any conflicting audio requests (Operation 520). For example, if two or more authorized users send audio clip requests at about the same, the Arbitration Manager determines which of those users has a higher priority, selects that user's audio for play, and discards all other competing requests (or buffers them to be played one after the other). The Arbitration Manager can include a synchronization mechanism that accounts for latency so that remote users are not unfairly disadvantaged by transmission delays.

The Arbitration Manager can consider a variety of inputs and algorithms for Choosing between competing requests, including consideration of User Interface Module interactions during Operation 514 while the CC Speaker was inactive. In one embodiment, the Arbitration Manager receives from each local User Interface Module a request to block any of the other users from playing clips to the corresponding local speaker during the next awake cycle. The Arbitration Manager accumulates such votes from all of the active User Interface Modules to decide whether or not to block a given user from playing sound clips via all CC Speakers 14 in the session. Various methods for choosing whether or not to block a user can be used, such as a 75% percent majority vote. A time-out feature can be used so that a block is only temporary and after a certain time period requires a re-vote to re-activate a block. In a simpler embodiment, each user pre-configures the user's friend list in a hierarchy that specifies a priority level for each friend for use in resolving competing requests for access.

The Arbitration Manager distributes the choice, and the selection is played at each site in the session (Operation 522). Each CC Speaker in the session then updates its window 44 with an identifier of the member who sourced the audio and plays the audio through its speakers 30 (Operations 524, 526); All User Interface Modules in the session update their trigger buttons to include a Reply Button for the most recently played audio, and update their On-Deck Menus. (Operations 524, 526).

Referring again to FIG. 1, Community Server 30 includes a connection manager 36 that establishes one or more connections to the twitter server 40 for receiving selected tweet streams. The manager is configured to monitor the twitter streams of session members. For example, if a Local User follows the twitter feed of a particular player, sports commentator or celebrity, that twitter feed can be added to the Local User's friend group. If the Local User invites a twitter friend to a CC Speaker session, the twitter connection manager is designed to monitor that friend's tweets and in response to selected tweet content, forward the text to each session member or issue a corresponding sound clip, e.g., using a text to speech engine (with a corresponding voice profile) to build an audio tweet.

As explained earlier, the Community Server 30 includes Event Managers 34 that provide User Interface Modules and CC Speakers with real-time notification of game events, such as a team score or other noteworthy events. This information is supplied to the CC Speaker controllers 80 that control when a CC Speaker 14 is active (Operation 512), and to On-Deck Managers that control the content displayed in the On-Deck Menus 401.

While the invention has been described in conjunction with the above embodiments, numerous alternatives, modifications, variations and uses will be apparent to those skilled in the art.

What is claimed is:

1. A social networking method for selecting and sharing audio-based messages between a plurality of users viewing a video program, the method comprising:
    automatically selecting a plurality of audio clips in response to a local user's selection of a first video program for viewing at a local site,
    displaying to said local user a menu that includes said automatically selected audio clips, wherein said menu identifies the content of each said audio clip,
    receiving from said local user a selection of an audio clip from said menu, and
    in response to said local user's selection of an audio clip from said menu, transmitting a request to play said user-selected audio clip on an audio speaker at a remote site while a remote user is viewing said first video program at said remote site.

2. The method of claim 1 wherein said automatic selection of audio clips is based at least in part on the genre of said first video program.

3. The method of claim 1 further comprising the steps of:
    determining when said local user has selected a second video program for viewing at said local site, and
    in response to said determination, automatically adjusting said selection of audio clips in said menu based on the identity or genre of said second video program.

4. The method of claim 1 further comprising the steps of:
    receiving real-time notice of an occurrence of an event in said first video program, and
    automatically adjusting said selection of audio clips in said menu in response to said real-time notice.

5. The method of claim 4 wherein said first video program is a live sports game and wherein said step of receiving real time notice of an occurrence of an event in said first video program comprises receiving from a network server a real-time notification of an occurrence of an event in said live sports game, and wherein said automatic menu adjusting step comprises displaying at least one new audio clip in the menu in response to said real-time notice.

6. The method of claim 5 wherein said game event includes a score or a player ejection.

7. The method of claim 1 wherein said first video program is a live sports game and wherein said automatic selection of audio clips includes automatically choosing at least some audio clips for inclusion in said menu based, at least in part, on predetermined preferences of said local user for a team or player in said live sports game.

8. The method of claim 1 wherein said automatic selection of audio clips includes monitoring the content of electronic messages between said local user and said remote user while said first video program is playing, and automatically choosing at least some audio clips for inclusion in said menu based upon said content of said electronic messages.

9. The method of claim 1 wherein said automatic selection of audio clips is further based on predetermined preferences of a plurality of members of a current community speaker session.

10. The method of claim 1 wherein said automatic selection of audio clips further comprises:
    searching at least one database that comprises a plurality of audio clips and associated parameters indicative of the content of said audio clips, wherein said associated parameters indicate the subject matter of audio clips from movies and television programs.

11. The method of claim 10 wherein said at least one database further includes personal audio recordings of said local user, audio recordings of celebrities, and sound effect recordings, and wherein said associated parameters indicate the content of each said recording.

12. The method of claim 11 further comprising the step of automatically adding to said database of personal audio recordings, audio messages recorded and sent by said local user during a community speaker session.

13. A method for exchanging messages between members of a social networking group, the method comprising:
    automatically selecting a plurality of audio clips, wherein said selection is based at least in part on the identity of a video program currently shown on a video display at a local site where a first member is located,
    displaying to said first member a menu that includes said automatically selected audio clips, wherein said menu includes an indication of the content of said audio clips,
    receiving from said first member a selection of an audio clip from said menu, and in response to said first member's selection,
    playing said member-selected audio clip on a community controlled speaker at said local site while said first member is viewing said first video program at said local site, and
    launching a request to play said member-selected audio clip on a community controlled speaker at a remote site while a second member is viewing said first video program at said remote site.

14. The method of claim 13 further comprising the step of:
    muting the audio of said video program at said first site while said member-selected audio clip plays on a community controlled speaker at said local site.

15. A social networking system for selecting and sharing audio-based messages related to a video program being viewed by members of a social networking group, the system comprising:
    on-deck manager module for automatically selecting a plurality of audio clips, wherein said selection is based at least in part on a first video program being viewed by a local member at a local site,
    display that presents to said local member a menu that includes said automatically selected audio clips, wherein said menu includes indications of the content of each said audio clip,
    user interface module for receiving from said local member a selection of an audio clip from said menu, network connection manager that, in response to said local member's selection, launches a request to play said member-selected audio clip on an audio speaker at a remote site while a remote member is viewing said first video program at said remote site.

16. The system of claim 15 wherein said on deck manager module performs said automatic selection of audio clips based at least in part on the genre of said first video program.

17. The system of claim 15 further comprising:
an event listener for determining when said local member has selected a second video program for viewing at said local site, and wherein said on-deck manager, in response to said determination, automatically adjusts said menu based on the identity or genre of said second video program.

18. The system of claim 15 further comprising:
an event listener for receiving from a network server a real-time notification of an occurrence of an event in said first video program, and wherein
said on-deck manager adjusts said selection of audio clips in said menu in response to said real-time notice.

19. The system of claim 15 further comprising:
a data storage system storing at least one database of audio clips and associated parameters indicative of the content of said audio clips, wherein said at least one database includes parameters that identify the subject matter of audio clips from movies and television programs.

20. The system of claim 19 wherein said at least one database further includes personal audio recordings of said social networking group members, audio recordings of celebrities, and sound effect recordings, and wherein said associated parameters indicate the content of each said recording.

21. The system of claim 20 further comprising the step of automatically adding to a database of said social networking group members' personal audio recordings, personal audio recordings sent by said social networking group members during a community speaker session.

* * * * *